United States Patent [19]

Kelley

[11] 4,339,705

[45] Jul. 13, 1982

[54] THYRISTOR SWITCHED INDUCTOR CIRCUIT FOR REGULATING VOLTAGE

[75] Inventor: Fred W. Kelley, Media, Pa.

[73] Assignee: General Electric Company, Philadelphia, Pa.

[21] Appl. No.: 242,784

[22] Filed: Mar. 11, 1981

Related U.S. Application Data

[63] Continuation-in-part of Ser. No. 49,825, Jun. 18, 1979.

[51] Int. Cl.$^3$ .............................................. G05F 1/70
[52] U.S. Cl. .................................................. 323/210
[58] Field of Search ............................. 323/209–211; 363/111

[56] References Cited

U.S. PATENT DOCUMENTS

| | | | |
|---|---|---|---|
| 3,601,686 | 8/1971 | Gautherin | 323/24 |
| 3,699,425 | 10/1972 | Hermansson et al. | 323/101 |
| 3,936,726 | 2/1976 | Kelley, Jr. | 323/24 |
| 3,936,727 | 3/1976 | Kelley, Jr. et al. | 323/102 |
| 4,121,150 | 10/1978 | Kelley, Jr. | 323/102 |
| 4,143,315 | 3/1979 | Kelley, Jr. | 323/24 |

OTHER PUBLICATIONS

Hammad et al., "A New Generalized Concept for the Design of Thyristor Phase–Controlled VAr Compensators, Part 1," IEEE Paper F78719-7, PES Summer Meeting in L.A., Ca., Jul. 16–21, 1978.
Hammad et al., "A New Generalized Concept for the Design of Thyristor Phase–Controlled VAr Compensators, Part II," IEEE Paper F78726-2, PES Summer Meeting in L.A., Ca., Jul. 16–21, 1978.

*Primary Examiner*—William H. Beha, Jr.
*Attorney, Agent, or Firm*—William Freedman; Carl L. Silverman; John P. McMahon

[57] ABSTRACT

A thyristor-switched inductor circuit is connected across a portion of a power system at which good regulation is desired. The thyristor-switched circuit delivers a leading or lagging current to compensate for a load of varying reactance and provides proper regulation at the desired portion of the power system. The thyristor-switched circuit comprises two parallel circuit branches each comprising an inductor and a thyristor in series, the thyristors being oppositely poled. The thyristor-switched circuit is operated during both the normal and the transient overvoltage conditions of the power system. During normal conditions the thyristor-switched circuit is operated at a conduction angle of less than 180° so that the forward and reverse currents, related to the thyristors, are not in an overlapped condition. Conversely, during transient overvoltage conditions the thyristor-switched circuit is operated at a conduction angle of greater than 180° so that the forward and reverse currents, related to the thyristors, are in the overlapped condition. The overlapped condition increases the inductive compensation, which, in turn, provides an effect so as to smooth or regulate the transient conditions in the power system.

6 Claims, 3 Drawing Figures

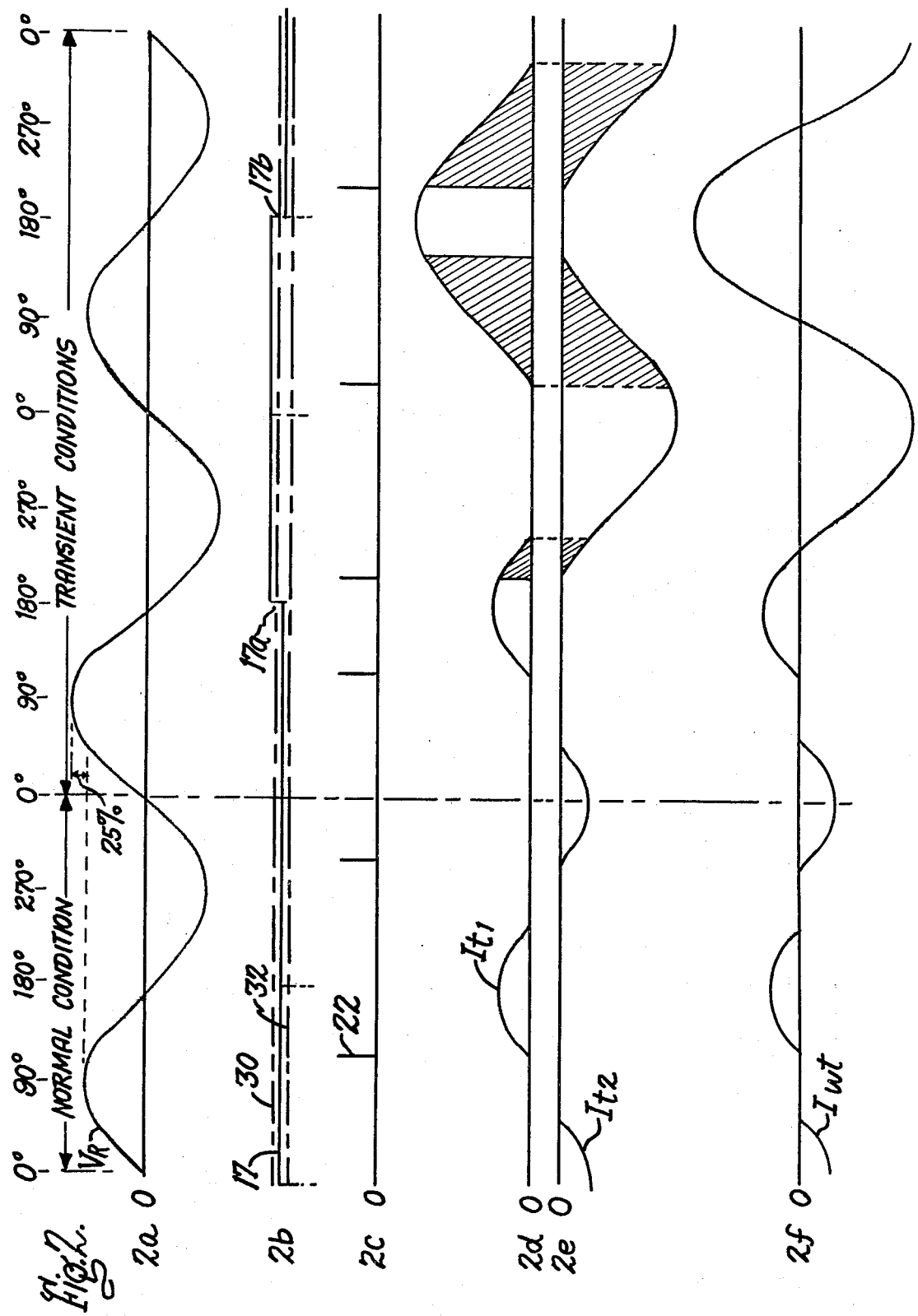

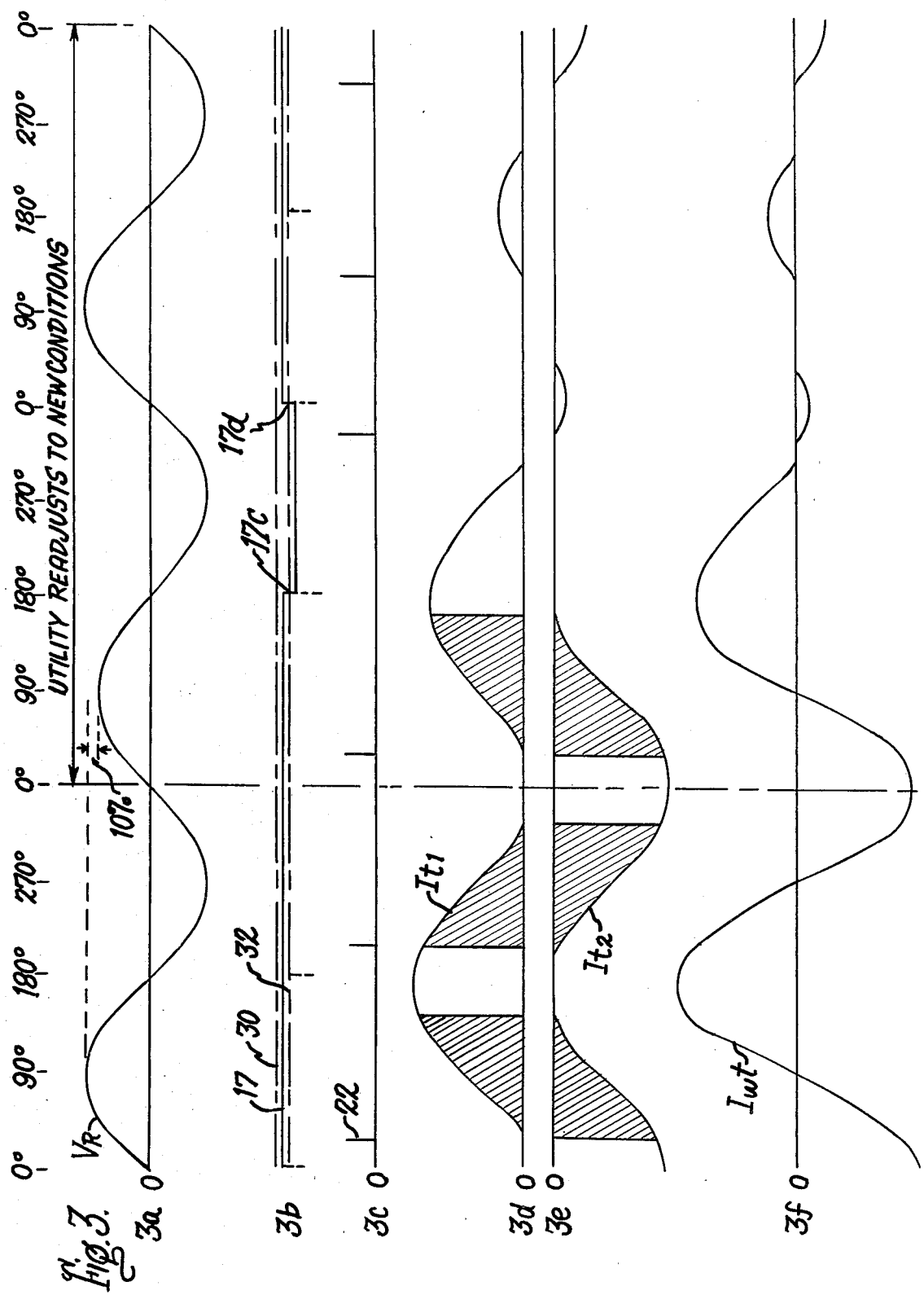

THYRISTOR SWITCHED INDUCTOR CIRCUIT FOR REGULATING VOLTAGE

The present application is a continuation-in-part of my prior application Ser. No. 49,825, filed June 18, 1979.

BACKGROUND OF THE INVENTION

The present invention relates to supplying a compensating leading or lagging reactive current to an A-C electric power system for stabilization of voltage, and more particularly, to a thyristor switched inductor circuit that is operated both during normal and transient conditions to develop such compensating currents.

It is known that electric power systems which supply highly erratic reactive loads, e.g., electric arc furnaces, are typically characterized by poor voltage regulation. Consequently, these power systems often exhibit an undesirable flicker. Compensating and regulating systems, herein simply referred to as regulating systems, suggested to alleviate this condition are disclosed in several of my issued U.S. Patents including: U.S. Pat. Nos. 3,143,315; 3,936,726; 3,936,727 and 4,121,150. The foregoing patents are hereby incorporated by reference into the present application.

Compensating systems having a thyristor circuit formed from a parallel arranged thyristors and inductors providing a leading or a lagging reactive current for regulating the voltage of an A-C electric power system are well known. One such thyristor circuit is described in IEEE Papers F78-719-7 and F78-726-2 by Hammad et al, entitled "A New Generalized Concept for a Design of Thyristor Phase-Controlled VAr Compensators", Parts I and II, presented at IEEE PES Summer Meetings in Los Angles, Cal., July 16–21, 1978. The thyristor circuit of Hammad et al, is operated to supply a variable inductance for regulating voltage of an A-C electric system. During overvoltage stresses an emergency firing mode is provided mainly to protect the thyristors from the overvoltage stresses. The emergency firing mode places the thyristors into their fully conductive mode during overvoltage stresses, which, in turn, effectively places a fixed inductance value across the A-C electric system during the overvoltage stress conditions. The maintenance of such a fixed inductance is inconsistent with the principle of varying the inductance to compensate or smooth the A-C line voltages during the transient condition. It is desirable that regulation be provided by a thyristor circuit such as to smooth these overvoltage transient conditions.

Accordingly, a general object of this invention is to provide a thyristor-switched inductor circuit that is operated to provide a variable inductance so as to develop compensating currents both during normal and transient conditions.

Another object of this invention is to provide such a thyristor-switched inductor circuit which operates to provide increased inductive compensation during the transient conditions as compared to the inductive compensation provided during normal conditions.

These and other objects of the present invention will become apparent to those skilled in the art upon consideration of the following description of the invention.

SUMMARY OF THE INVENTION

The present invention is directed to a regulating system having a reactive converter which includes a thyristor switched inductive circuit. The reactive converter delivers a leading or lagging current to compensate for a load of varying reactance in a power system. The regulating system has means for deriving a first signal representative of voltage at a critical area in the power system at which good voltage regulation is desired. The regulating system further has means for deriving a second signal representative of the desired voltage regulation level. The difference in these signals, known as the error signal, acts via regulating loop means to hold the first and second signals in close correspondence if within the range capability of the reactive converter. The regulating system includes a comparison means for sensing non-correspondence between the first and second signals and developing in dependence upon the difference a command signal indicative of whether normal or transient conditions are present in the power system. The regulating system further includes gating control means responsive to the command signal for supplying an output signal therefrom to the reactive converter so as to regulate the voltage at the critical area both during normal and transient conditions. The reactive converter comprises two circuit branches connected in parallel across the power system. Each branch comprises an inductor and a thyristor connected in series. The thyristors are oppositely poled and each of the thyristors provide a unidirectional path through its inductor. The reactive converter further comprises a capacitor connected across the power system in parallel with the two branches. The gating means in effecting voltage regulation during normal conditions causes each of the thyristors to have a conduction angle of 180° or less in response to the comparison means sensing the presence of normal conditions in the power system, and in effecting voltage regulations during transient conditions causes each of the thyristors to have a conduction angle greater than 180° in response to the comparison means sensing the presence of transient power conditions in the power system.

The features of the invention believed to be novel are set forth with particularlity in the appended claims. The invention, itself, however, both as to its organization and method of operation, together with further objects and advantages thereof, may be best understood by reference to the following description taken in conjunction with the accompanying drawings.

BRIEF DESCRIPTION OF THE DRAWINGS

FIG. 2 is a diagram showing the relationship of the compensating currents during the normal and transient conditions.

FIG. 3 shows further details of the compensating currents during the transient conditions.

DETAILED DESCRIPTION OF THE INVENTION

Figure 1:
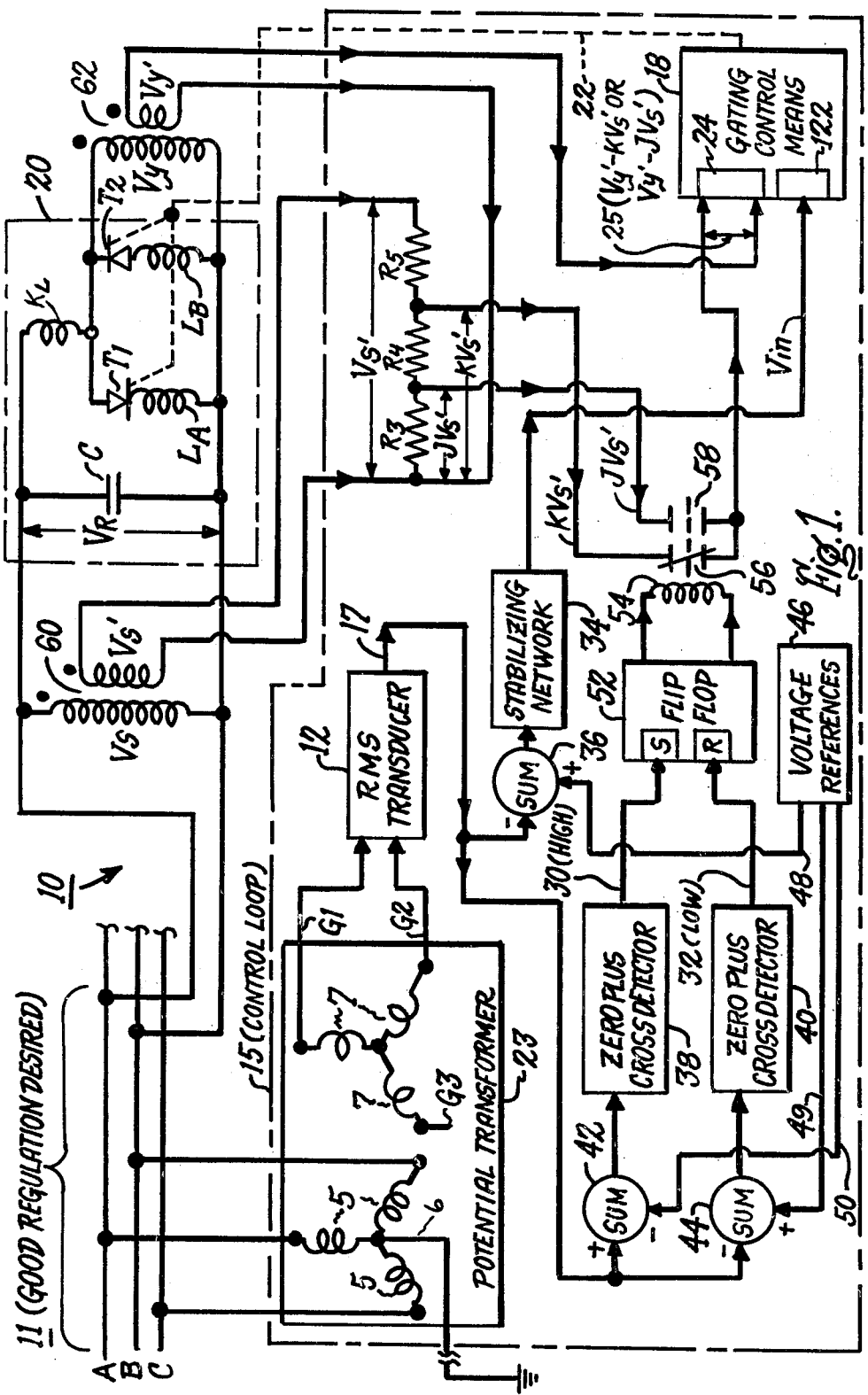
FIG. 1 is a block diagram of the present invention.

FIG. 1 shows a block diagram 10 representative of the present invention. FIG. 1 shows a critical area 11 of the power system (not shown) in which good voltage regulation is desired. FIG. 1 further shows a control loop 15 having inputs supplied by connecting to phases A, B, and C of the power system and an output signal 22 which controls the operation of a thyristor switched inductor circuit 20. As will be explained, control loop 15 acts as a regulating system for controlling the thyristor switched inductor circuit 20, which, in turn, functions as a reactive converter for delivering a leading or lagging current to compensate for a load in the power system of varying reactance. The interaction of control loop 15 provides means responsive to the actual and desired voltage levels at critical area 11 for developing an error signal to hold the actual and desired voltages in close correspondence by the operation of the thyristor switched inductor circuit 20.

The control loop 15 and thyristor switched inductor circuit operate to provide good regulation at the critical area related to voltages at phases A, B, and C. For the sake of clarity, the operation of control loop 15 and thyristor switched inductor circuit 20 and their related interconnections to the power system will only be described for regulating the phase A to phase B voltage of the power system. However, it should be understood that the following description of the control loop 15 and the thyristor switched inductor circuit 20 related to regulating the phase A to phase B voltage is also applicable to regulating the phase B to phase C and phase C to phase A voltages of the power system.

The thyristor switched inductor circuit 20 is shown as being connected across the phases A and B of the power system and as having an input voltage $V_R$ applied across a capacitor C representative of the phase A to phase B voltage of the power system. As discussed, additional circuits 20 (not shown but substantially identical to the circuit illustrated) are separately connected across phases B and C and phases C and A. The illustrated circuit 20 comprises two circuit branches connected in parallel across the phase conductors A and B. One branch comprises an inductor $L_A$ and a thyristor T1 connected in series; and the other branch comprises an inductor $L_B$ and a thyristor T2 connected in series. The thyristors T1 and T2 are oppositely poled and each provides a unidirectional path through its inductor. Connected in series with the two branches is an inductor common to the two branches and having and inductance KL, where K is an arbitrary number. The inductors $L_A$ and $L_B$ are preferably of equal value. Each of the separate thyristors T1 and T2 provides a unidirectional current path, under control of a signal 22 from control loop 15, to be described hereinafter with regard to FIGS. 2 and 3.

Control loop 15 is connected across phases A, B, and C of the power system via a potential transformer 23. The illustrated potential transformer 23 comprises: primary windings 5 connected in Wye across the phase conductors A, B, and C and having a grounded common neutral 6, and Wye-connected secondary windings 7 having output terminals G1, G2, and G3. Potential transformer 23 develops a signal representative of the actual phase A to phase B voltage at its output terminals G1 and G2. Signals representative of phases B to C voltage and phases C to A voltage are also developed by potential transformer 23 for control loop 15, but, as previously discussed these signals will not be described.

Control loop 15 is mainly comprised of elements formed from conventional type logic. Table I lists the main elements of control loop 15 and, where applicable, references one of my U.S. Patents that gives the details of their operation or references the element as being conventional.

TABLE I

| Elements of Control Loop 15 | U.S. Pat. No. |
| --- | --- |
| RMS Transducer (12) | 4,143,315-description of element 262 |
| Summers 36, 42 and 44 | 4,143,315-description of element 264 |
| Zero plus cross detectors 38 & 40 | 3,936,726-description of element 54 |
| Stabilizing network 34 | 4,143,315-description of elements 266 and 268 |
| Flip Flop 52 | conventional type |
| Relay 54 and its contacts 56 and 58 | conventional type |
| Potential transformer 23 | 4,143,315-description of element 258 |
| Gating control means 18 | 3,936,726 |

The gating control means 18 of control loop 15 of FIG. 1 is shown as having two elements 24 and 122. The description of these elements 24 and 122 is given in my U.S. Pat. No. 3,936,726, for elements having the same reference numbers. Furthermore, FIG. 1 shows an element voltage references 46. FIG. 1 shows an element voltage references 46. Voltage references 46 may be of a conventional power supply having three voltage outputs 48, 49 and 50, whose selected values will be described hereinafter.

As will be explained the potential transformer 23 and RMS transducer 12 derive a first signal 17 representative of the actual voltage at the critical area 11. The outputs 48, 49, and 50 of voltage references 46 are used by (1) summing means 36 for deriving a second signal representative of a desired voltage regulation level, (2) means responsive to the first and second signals for developing error type signals which are used to hold the first and second signal in close correspondence if within the range capability of the reactive converter.

The output 48 is routed to the positive (+) input of summer 36. The output 49 is routed to the positive (+) input of summer 44. The output 50 is routed to the negative (−) input of summer 42. The outputs 48, 49 and 50 of voltage references 46 provide reference signals to summers 36, 42 and 44 which, as will be explained hereinafter, inhibit outputs from the summers 42 and 44 until a second input of the respective summers 42 and 44 each exceed a predetermined value.

A second input of summer 36 is applied to the negative (−) input of summer 36. The second input is developed by the RMS transducer 12. The summer 36 develops an output which is routed to stabilizing network 34, which, in turn, develops an output signal $V_{in}$, which, in turn, is applied to the previously referenced logic element 122 described in U.S. Pat. No. 3,936,726.

The second input of summer 42 is applied to the positive (+) input of summer 42. The second input of summer 42 is developed by the RMS transducer 12. When the second input exceeds the negative reference 50, to be hereinafter referred to as the high voltage threshold limit related to the transient conditions of the power system, the summer 42 develops an output which is routed to the zero plus cross detector 38, which, in turn, develops an output signal 30, which, in turn, is routed to the Set (S) input of the flip-flop 52, which, in turn, activates or picks-up relay 54.

The second input of summer 44 is applied to the negative (−) input of summer 44. The second input of summer 44 is developed by the RMS transducer 12. When the second input is less than the positive reference 49, to be hereinafter referred to as the low voltage threshold limit related to the transient conditions of the power system, the summer 44 develops an output which is routed to the zero plus cross detector 40, which, in turn, develops an output signal 32, which, in turn, is routed to the Reset (R) input of the flip-flop 52, which, in turn, deactivates or drops-out relay 54.

Relay 54 has a pair of normally-closed (NC) contacts 56 and a pair of normally-open (NO) contacts 58. When relay 54 has been activated by the set-condition of flip-flop 52, the contacts 58 are closed and a signal $JV_S'$ is routed to one side of the previously mentioned element 24 of gating control means 18 described in U.S. Pat. No. 3,936,726. Conversely, when relay 54 has been deactivated by the reset-condition of flip-flop 52, the contacts 58 are opened and contacts 56 are closed, which, in turn, routes a signal $KV_S'$ to the previously mentioned one side of element 24. The other side of element 24 is connected to a signal $V_y'$. The signal applied across element 24 is shown in FIG. 1 as 25 ($V_y'-KV_S'$ or $V_y'-JV_S'$).

The source of signals $KV_S'$ and $JV_S'$ is a voltage $V_S$ developed by a conventional transformer 60 having its primary winding connected across phases A and B of the power system and having the polarity markers as shown in FIG. 1. The output or secondary winding of the transformer 60 develops a signal $V_S'$. The signal $V_S'$ is routed so as to be applied across a voltage divider network formed by serially arranged resistors R3, R4 and R5. The values are selected for resistors R3, R4 and R5 so as to provide the two signals $JV_S'$ and $KV_S'$ which are proportional to the applied voltage $V_S'$. The voltage across resistor R3 is shown as $JV_S'$. The voltage across R3 and R4 is shown as a $KV_S'$ and accordingly is of a larger value than $JV_S'$. One side of resistor R3, the common of the voltage divider, is connected to the secondary winding of transformer 60. The common of the voltage divider is further connected to one side of the secondary winding of a conventional transformer 62.

The primary side of transformer 62 is connected across the parallel arranged thyristors T1 and T2 and their respective inductors $L_A$ and $L_B$. The secondary winding of transformer 62 develops a signal $V_y'$. One side of the secondary winding of transformer 62 is applied to one side of input signal 25 of element 24 of gating control means 18.

The input signal 25 ($V_y'-KV_S'$ or $V_y'-JV_S'$) to element 24 is representative of the condition of the conductive and the non-conductive states of thyristors T1 and T2. The circuitry to develop this signal 25 adapts the gating control means 18 of U.S. Pat. No. 3,936,726 so as to provide the desired control of the thyristor switched inductor circuit 20. In particular, the circuitry to develop signal 25 provides the element 24, described in U.S. Pat. No. 3,936,726, with the desired feed-back signal indicative of the conductive states of thyristors T1 and T2 of circuit 20.

For the purpose of controlling the thyristor switched inductor circuit 20 involving KL, $L_A$ and $L_B$, the voltages $KV_S'$ and $JV_S'$ and $V_y'$ are chosen (by appropriate selection of the secondary voltage of transformer 60, resistive values R3, R4 and R5 and the secondary voltage of transformer 62) such that with current flow through $L_A$ and/or $L_B$ the voltage $V_y'$ is substantially equal to $KV_S'$ of $JV_S'$, to be described, and thus the signal 25 is substantially zero. The condition of current flow through $L_A$ or $L_B$ is indicative that thyristors T1 and/or T2, respectively, are conducting. If either thyristor T1 or T2 alone is conducting the sensed voltage ($V_y'-KV_S'$) is zero which is similar to the operation for element 16 developed for the gating controller described in U.S. Pat. No. 3,936,726 with reference to its FIG. 1. If neither thyristor T1 or T2 is conducting the sensed voltage ($V_y'-KV_S'$) is not zero which is also similar to the operation for element 16 developed for the gating controller described in U.S. Pat. No. 3,936,726. Furthermore, if thyristors T1 and T2 are conducting the sensed voltage ($V_y'-JV_S'$) is zero which is similar to the operation of the element 16 of U.S. Pat. No. 3,936,726. Still further, if either thyristors T1 or T2 is not conducting the sensed voltage ($V_y'-JV_S'$) is not zero which is also similar to the operation of the element 16 of U.S. Pat. No. 3,936,726.

Furthermore, the signal 25 provides a feedback signal to the element 24 which effects control in the non-overlap state with $V_y'-KV_S'$) and also in the overlap state with ($V_y'-JV_S'$). This feedback path provided by signal 25 allows the gating control means 18 to sense the condition of the conductive states of the thyristors T1 and T2. The gating control means 18 is responsive to a command signal $V_{in}$, via its input 122, and the signal 25, via its input 24, for supplying a control signal 22 which controls the operation of the thyristor switched inductive circuit 20. The development of signal $V_{in}$ and signal 25 by the control loop 15 is best understood from a general description of the operation of control loop 15.

In general, the potential transformer 23 of control loop 15 develops a signal at its output terminals G1 and G2 which is representative of the phase A to phase B voltage at the critical area 11. The signal across G1 and G2 is applied to an RMS transducer 12 which develops a signal at its output 17 which is representative of the RMS value of the phases A to B voltage. The output 17 is applied to: (1) the negative input of summer 36, (2) the positive input of summer 42, and (3) the negative input of summer 44.

Summer 36 represents the mixing stage of a conventional voltage regulating loop where the input reference signal 48 minus the input feedback signal 17 results in an error signal output from the summer 36. Said error signal output is transmitted to the stabilizing network 34. The stabilizing network is a conventional frequency attenuating amplifier employed with regulating loops. Stabilizing network output $V_{in}$ is transmitted as a command signal to input element 122 of gating control means 18. The function of gating control means 18 responsive to signal $V_{in}$, which, in turn is responsive to signal 17 will be described hereinafter with regard to FIGS. 2 and 3. The response of summer 36 to signal 17 and output 48 derives the second signal representative of a desired voltage regulation level at critical area 11.

The output 17 applied to summers 42 and 44 is monitored by two threshold networks each mainly comprising, (1) the zero plus cross detector 38 determining if the output 17 exceeds or is greater than a high voltage threshold limit established by the negative reference signal 49, and (2) the zero plus cross detector 40 determining if the output is less than a low voltage threshold limit established by the positive signal 49. These two threshold networks each responsive to the first signal 17 act as a comparison means for sensing non-correspondence between the desired and actual voltage levels at critical area 11 to determine if signal 17 is representative of a normal or transient condition and further determine if signal 17 is experiencing any transient which is greater than a high voltage transient or less than a low voltage transient.

If output 17 exceeds a value, such as 1.05 per unit volts, zero plus cross detector 38 generates the signal 30 (HIGH), which, in turn, sets flip-flop 52 to allow the quantity $JV_S'$ to be developed for the signal 25, which, in turn, is applied to the element 24 of the gating control means 18.

If output 17 is less than a value, such as 0.98 per unit volts, zero pluus cross detector 40 generates the signal 32 (LOW), which, in turn, resets flip-flop 52 to allow the quantity $KV_S'$ to be developed for the signal 25 which is applied to the element 24 of the gating control means 18.

Another method for controlling the state of the flip-flop 52 is to replace the input 17 to summers 42 and 44 with the $V_{in}$ taken from the output of the stabilizing network. This modification will require readjustment of the reference voltages applied to the summers 42 and 44. The function of gating control means 18 operating with signal 25 having $JV_S'$ or $KV_S'$ quantity is best described with regard to FIGS. 2 and 3.

FIG. 2 shows the operation of the control loop 15 and the thyristor switched inductive circuit 20 during the presence of normal conditions and during the presence of transient conditions. The uppermost portion of FIG. 2 gives the phase relationship of the signal $V_R$ of the phase A to phase B voltage of the power system. This phase or timing relationship is applicable to all the signals shown in FIG. 2. FIG. 2 further shows signals, (1) signal 17 developed by the operation of the RMS transducer 12, (2) signal 30 which is the high voltage threshold limit, (3) signal 32 which is the low voltage threshold limit, (4) the control signal 22, (5) $I_{t1}$ which is the current related to the forward conducting thyristor T1, (6) $I_{t2}$ which is the current related to the reverse conducting thyristor T2, and (7) $I_{\omega t}$ which is the summation or composite current $I_{t1}$ and $I_{t2}$.

In the operation of the control loop 15, the presence of a normal condition, as shown in FIG. 2a, causes the RMS transducer 12 to develop a signal 17 (FIG. 2a) having a D.C. value which is greater than the low threshold signal 32 but less than the high threshold signal 30. Thus a normal signal $V_{in}$ is accepted by the gating control means 18, which, in turn, develops the signal 22 shown in FIG. 2c as having two pulses which are applied to thyristors T1 and T2. The first pulse occurs at a value of greater than 90° referenced to signal $V_R$ and causes thyristor T1 to develop its current $I_{t1}$ having a duration as shown in FIG. 2d which is less than 180° of conduction angle. The second pulse occurs at a value of greater than 270° referenced to signal $V_R$ and causes thyristor T2 to develop its current $I_{t2}$ having a duration as shown in FIG. 2e which is less than 180° of conduction angle. The composite of the currents $I_{t1}$ and $I_{t2}$ is shown in FIG. 2f as a signal $I_{107\ t}$. From FIG. 2 it should be noted that the current $I_{t1}$ and $I_{t2}$ occurring during the normal conditions are not in an overlapped condition. During normal conditions the critical area 11 of the power system whose voltage is represented by $V_R$ is supplied with compensating current $I_{t1}$ and $I_{t2}$ so as to maintain the desired voltage during these normal conditions.

FIG. 2 further shows the operation of control loop 15 and thyristor switched inductive circuit 20 during transient conditions. The signal $V_R$ occurring during the transient conditions is shown in FIG. 2a as having an initial peak value which is approximately 25% higher than signal $V_R$ occurring during its normal conditions. The control loop 15 detects the presence of this abnormal condition by sensing the voltage level of signal 17 at 17a as illustrated with FIG. 2b. Since at 17a the signal 17 exceeds the reference 50, the output of summer 42 causes the zero plus cross detector to develop output signal 30 (HIGH) that sets the flip-flop 52 which, in turn, actuates relay 54 which, in turn, alters signal 25 applied to element 24 of the gating control means 18. Thus, due to the detection of the transient overvoltage condition, the signal 25 is changed from being $V_y'-KV_S'$ to being $V_y'-JV_S'$. This alteration alters the timing of the control signal 22 engendering overlapped conduction of the thyristor switched inductor circuit 20.

During the presence of the transient conditions the control signal 22 is applied to thyristors T1 and T2 during the intervals as shown in FIG. 2 causing each thyristor T1 and T2 to have a conduction angle greater than 180°, as shown in FIGS. 2d and 2e, which represents overlapped conductions of the thyristor T1 and T2. The overlapped conductions of T1 and T2 is shown in FIGS. 2d and 2e by cross-hatching of the current $I_{t1}$ and $I_{t2}$. The composite compensating current $I_{\omega t}$ is increased during these transient conditions as shown in FIG. 2f. The resulting effect of the increased compensating current $I_{\omega t}$ is further shown in FIG. 2a as causing a smoothing or reducing of signal $V_R$. The reduction of signal $V_R$ is detected by the decreasing output signal 17 of RMS transducer 12 and the return of output signal 17 to its normal value is shown at 17b.

During the overlap of conduction of thyristors T1 and T2, the separate inductors $L_A$ and $L_B$ are paralleled and in series with the inductor KL, if K is not equal to 0. Such overlap operation results in an increase in the magnitude of available compensation current shown in FIG. 2f $I_{\omega t}$ for the thyristor switched inductor circuit 20. More particularly, with the arbitrary constant K equal to 0, with respect to the circuit 20 of FIG. 1, the MVAR rating during such overlap is two times the MVAR rating during non-overlap. The term, MVAR rating is commonly employed in connection with regulating systems of the type previously mentioned, and represents the magnitude of the rating of the circuit. It is to be appreciated that, if the constant K has a value other than 0, the ratio of overlapping rating to non-overlapping will be less than 2.

The performance of the control loop 15 and thyristor-switched circuit 20 is further shown in FIG. 3. FIG. 3 is illustrated in a manner similarly described for FIG. 2 and is further illustrated as being a continuation of the waveforms shown in FIG. 2. FIG. 3 shows more details of the interaction of the control loop 15 and circuit 20 that may occur during the readjustment to new conditions by a power utility. In particular, FIG. 3 shows the signal $V_R$ as it is being returned to its normal condition by the composite compensation current $I_{\omega t}$, following which the system is subjected to a utility readjustment operation. The typical readjustment operation causes a decrease in the signal $V_R$ shown in FIG. 3a as a decreasing value of approximately 10% referenced to the normal condition of signal $V_R$. The control loop 15, in particular, RMS transducer 12 senses this decrease and provides a corresponding signal 17 having a voltage level which is less than the low voltage threshold signal 32. The detection of the below normal voltage by control loop 15 is shown in FIG. 3b at 17c. The zero plus cross detector 40 in response to the below normal step in signal 17 at 17c actuates the flip-flop 52 reset which, in turn, deactivates the coil of relay 54, which, in turn, changes the input to element 24 of gating control means 18 from $V_y'-JV_S'$ to $V_y'-KV_S'$. The gating control 18, in particular, element 24 detects the presence of signal 25 being equal to $V_y'-KV_S'$ and alters the timing of control signal 22, as shown in FIG. 3c. During the presence of the low transient conditions and after the downward step in signal 17 at 17c, the control signal 22 is applied to thyristors T1 and T2 during the intervals as shown in FIG. 3c so to remove the overlapped conduction of T1 and T2. The conduction periods of T1 and T2 shown in FIGS. 3d and 3e cause a reduced composite compensation current $I_{\omega t}$, which, in turn, allows the signal $V_R$ to increase to its desired value represented by the signal $V_R$ occurring during normal conditions. The increased signal $V_R$ is detected by an increased output signal 17 of RMS transducer 12 and the return of output signal 17 to its normal value is shown in FIG. 3b a 17d.

The development of signals 30 and 32 (FIGS. 2b and 3b) by control loop 15 provides a comparatively tight or close regulation of the signal $V_R$. The control loop 15 and circuit 20, are well suited for use in connection with electrical utility transmission system for regulating voltage.

It should now be appreicated that the circuit arrangement shown in FIG. 1, in particular circuit arrangement of the control loop 15 controlling the operation of circuit 20 provides the compensating inductive currents that may be used to regulate the voltage at a critical area 11 of the high voltage system requiring good voltage regulations both during normal and transient conditions.

The circuit 20 and control loop 15 having appropriate modifications are also well suited for use in an industrial power system serving an erratic reactive load, e.g., an arc furnace. In this connection, for further information with respect to arc furnace type applications of the present inventions it is helpful to refer to my U.S. Pat. No. 3,936,727, entitled "High Speed Control of Reactive Power for Voltage Stabilization in Electric Power Systems", issued Feb. 3, 1976, previously incorporated by reference in the present application. More particularly, this patent discloses exemplary procedures for obtaining signals useful in the control of the reactive converter.

The block diagram 10 of FIG. 1 need only be modified as follows to serve the erratic reactive loads in lieu of the desired voltage regulation at critical area 11: (1) a reactive current sensor, similar to sensor 50 described in my U.S. Pat. No. 3,936,727, is supplied with signals representative of the reactive component of the load current, (2) the output of sensor 50 supplies a voltage signal representative of the reactive load current, which, in turn, is directly applied to element 122 of gating control means 18, which, in turn, controls the thyristor switched inductor circuit 20, (3) the output of sensor 50 is routed to current threshold limit circuits, similar to the previously described circuits formed from summers 42 and 44, zero plus cross detectors 38 and 40, flip-flop 52 and relay 54, to control the non-overlapped and overlapped conditions of T1 and T2 of circuit 20.

While I have illustrated preferred embodiments of my invention, many modifications will occur to those skilled in the art and I, therefore, wish to have it understood that I intend in the appended claims to cover all such modifications as fall within the true spirit and scope of my invention.

What I claim as new and desire to secure by Letters Patent of the United States is:

1. In a regulating system of the type having: a reactive converter for delivering a leading or lagging current to compensate for a load of varying reactance; means for deriving a first signal representative of voltage at a critical area in the power system at which good voltage regulation is desired; means for deriving a second signal representative of a desired voltage regulation level; means responsive to said first and second signals for developing an error signal for said regulating system which is used to hold the first and second signals in close correspondence if within a desired range of the reactive converter; comparison means for sensing the non-correspondence between said first and second signals and developing in dependence upon said non-correspondence a command signal indicative of whether normal or transient conditions are present in the power system;

gating control means responsive to said command signal for supplying an output signal therefrom to the reactive converter so as to regulate the voltage at said critical area both during normal and transient conditions, wherein the reactive converter further comprises:

a. two circuit branches connected in parallel across said power system, each branch comprising an inductor and a thyristor connected in series, said thyristors being oppositely poled and each of said thyristor providing a unidirectional path through its inductor;

b. a capacitor connected across said power system in parallel with said two branches; and gating control means in effecting said voltage regulation during normal conditions causing each of thyristors to have a conduction angle of 180 degrees or less in response to said comparison means sensing the presence of normal power conditions in the power system and, in effecting said voltage regulation during transient conditions, causing each of said thyristors to have a conduction angle of greater than 180 degrees in response to said comparison means sensing the presence of transient power conditions in the power system.

2. A reactive converter in accordance with claim 1 in which both of said two circuit branches are coupled to a common inductor.

3. A reactive converter in accordance with claim 1 in which each of the inductors are of substantially the same value.

4. In a regulating system of the type having: a reactive converter for delivering a leading or lagging current to compensate for a load of varying reactance; means for deriving a first signal representative of a reactive component of a load current at a desired location in a power system; means for deriving a second signal representative of a desired reactive component of load current; means responsive to said first and second signals for developing an error signal for said regulating system to hold the first and second signals in close correspondence if within a desired range of the reactive converter; comparison means for sensing the non-correspondence between said first and second signals and developing in dependence upon said difference a command signal indicative of whether normal or transient conditions are present in the power system;

gating control means responsive to said command signal for supplying an output signal therefrom to the reactive converter so as to regulate the effect of the varying reactance load on the voltage at the critical area both during normal and transient conditions, wherein the reactive converter further comprises:
a. two circuit branches connected in parallel across said power system, each branch comprising an inductor and a thyristor connected in series, said thyristors being oppositely poled and each of said thyristors providing a unidirectional path through its inductor;
b. a capacitor connected across said power system in parallel with said two branches; and
said gating control means in effecting said reactive current regulation during normal conditions causing each of thyristors to have a conduction angle of 180 degrees or less in response to said comparison means sensing the presence of normal power conditions in the power system, and in effecting said voltage regulation during transient conditions causing each of said thyristors to have a conduction angle of greater than 180 degrees in response to said comparison means sensing the presence of transient power conditions in the power system.

5. A reactive converter in accordance with claim 4 in which both of said two circuit branches are coupled to a common inductor.

6. A reactive converter in accordance with claim 4 in which each of the inductors are of substantially the same value.

* * * * *